Jan. 4, 1927.  1,613,443
D. D'AMATO
MOTOR VEHICLE
Filed Oct. 9, 1925

Inventor
Domenick D'Amato,
By Clarence A. O'Brien
Attorney

Patented Jan. 4, 1927.

1,613,443

UNITED STATES PATENT OFFICE.

DOMENICK D'AMATO, OF NEW HAVEN, CONNECTICUT.

MOTOR VEHICLE.

Application filed October 9, 1925. Serial No. 61,544.

This invention relates to improvements in construction on motor vehicles and more particularly to that of the stub axle, spindle, mud guard and headlight mounting structure attached to the front axle of the vehicle.

An object of the invention resides in providing a unit structure forming a spindle for mounting on the front axle of the motor vehicle which is adapted to mount the front wheel, the mud guard and the head lamp of the vehicle therein in a convenient and efficient manner.

Another object of the invention resides in providing an improved spindle structure of special form having a plate member formed to receive and mount the front mud guard and head lamp of the motor vehicle so that the same will turn with the wheel automatically upon the operation of the steering mechanism.

A still further object of the invention resides providing a spindle structure having a cast plate member of substantially rectangular formation adapted to be received in an opening formed in the mud guard so that form retaining means carried by the mud guard are detachably connected with the plate member for mounting the mud guard thereon for movement with said spindle member and the wheels carried thereby.

The invention comprehends numerous other objects and improvements in the details of construction and the arrangement of parts which are more particularly pointed out in the following description and claimed, directed to a preferred form of the invention, it being understood, however, that various changes may be made in the specific construction of spindle member and association of the mud guard and lamp mounting therewith which are found desirable for adapting the special spindle structure to the various types of motor vehicles now in use including those provided with four wheel brakes, which adaptations will require slight modifications in the form of the invention which are clearly within the scope of the following drawings, description and claims of the invention as herein set forth.

In the drawing forming part of this application:—

Figure 1:
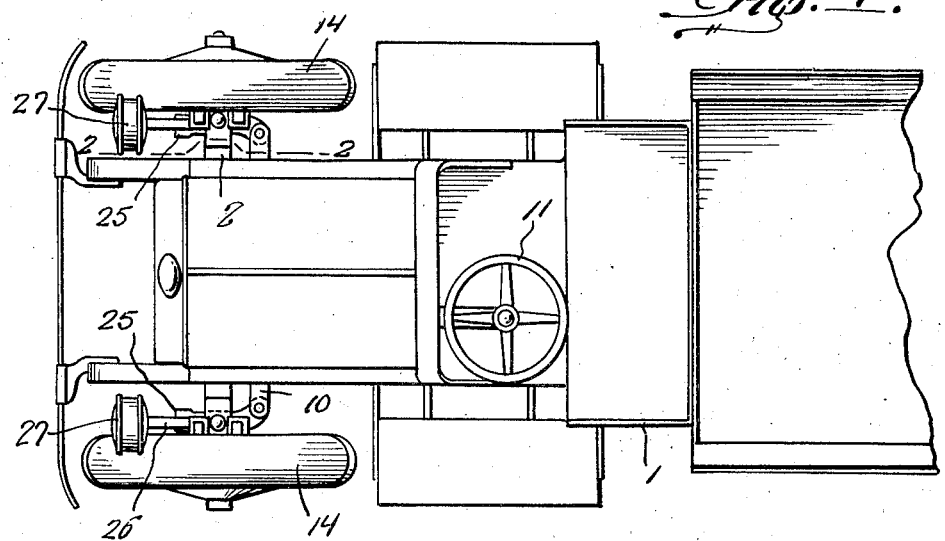
Figure 1 is a plan view of the front portion of a motor vehicle showing the improved invention applied thereto.
Figures 2, 3, 4:
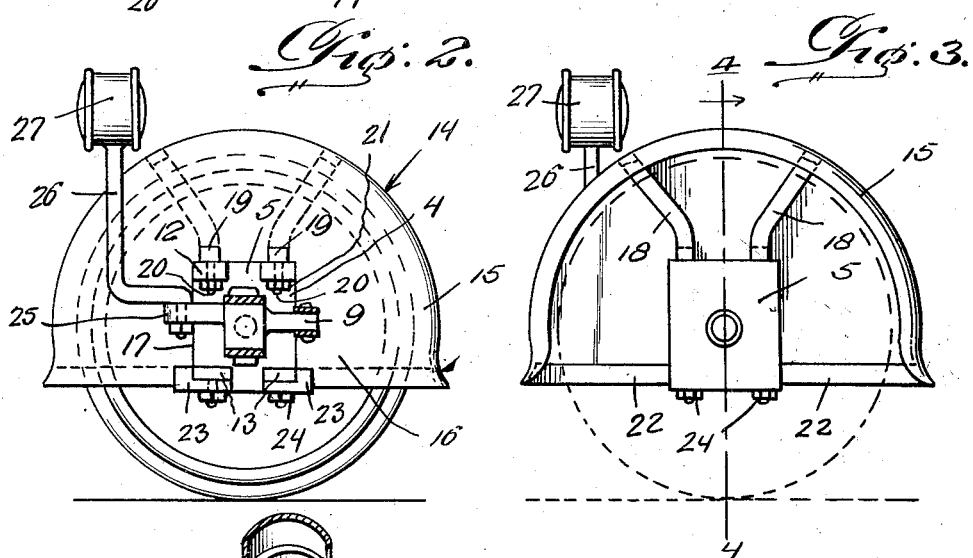
Fig. 2 is a sectional view taken on the line 2—2 of Fig. 1.
Fig. 3 is a side elevation from the side of the motor vehicle of the front wheel structure, the wheel having been removed.
Fig. 4 is a vertical sectional view through the spindle structure and mud guard taken on the line 4—4 of Fig. 3.

A motor vehicle is indicated generally by the numeral 1, which is provided with the front axle 2 having the spindle fork 3 for mounting the special spindle structure 4 forming a portion of this invention. This special spindle structure is formed of a substantially heavy cast body including as the major portion thereof the plate member 5 which is illustrated as of rectangular formation formed with a central projection at one side at 6, providing the axle stub for mounting the front wheel of the vehicle. In alinement with this stub axle 6 and from the opposite side of the plate member 5 is formed the spindle projection 7 having an opening therein for receiving the king bolt 8 adapted for pivotally mounting the cast plate member in the spindle fork of the axle. This plate member 5 and the spindle projection 7 is formed with a knuckle arm 9 adapted to receive the knuckle connection of the connecting rod 10 of the steering mechanism by which the front wheels of the vehicle are controlled and steered by the operation of the steering wheel 11.

The plate member 5 is formed with inwardly extending projections 12 at the upper corners thereof and similar projections 13 at the lower corners thereof. A mud guard is indicated at 14 having the crown portion 15 to prevent splash from the wheel from being thrown into the motor vehicle and an inner side wall 16 which is formed with an opening 17 in the central portion of a size and configuration adapted to receive the plate member 5 and seat on the edge portion thereof. Form retaining members 18 are secured at spaced intervals in the central portion of the mud guard and are formed with laterally extending feet 19 adapted to seat on the upper ends of the projections 12 which are formed with threaded projections 20 for receiving a nut 21, which projections are adapted to extend through openings formed in the projections 12 and upon the application of the nut 21 to rigidly secure the mud guard to the upper projections 12. At the lower edges of the mud guard are formed retaining members 22 which are provided with securing feet 23 adapted to fit the under side of the projections 13 and being secured thereto by suitable bolt nut connections 24.

In applying this mud guard to the plate member 5, the same is first tilted slightly and these projections 20 pass through the openings in the ears or projections 12 on the plate member and the same move downwardly therein until the lateral extensions 19 seat on the upper edges of said plate member, after which the lower end portion of the mud guard has the feet portions 23 of the form retaining members 22 moved under the lower edge of the plate member to bring the openings 12 therein in registry with the openings in the ears or projections 13 on the lower end of the plate members so that the bolt and nut connections may be applied thereto and the mud guard rigidly secured to the plate member for movement therewith.

The spindle projections 7 and the plate member 5 is formed with a normally forwardly projecting arm 25 adapted to mount the lamp bracket 26 in the forward end thereof, carrying the lamp 27 at the upper end so that the mud guard and the head lamp for the motor vehicle are all carried on said plate member for movement therewith and with the wheel.

This invention therefore provides a unit structure in which the wheel, mud guard, and head lamp are mounted on the cast plate member forming a spindle and stub axle structure pivotally mounted through the medium of the king bolt 8 in the front axle of the motor vehicle.

It should be further appreciated that the mud guard is readily detachable through the removal of the bolt and nut connections 24 and the nuts 21 by swinging the lower end or edge of the mud guard outwardly beyond the face of the plate member 5 and then raising the same upwardly to disconnect the projections 20 from the ears or projections 12 on the plate member 5. In addition the form retaining members 18 and 22 form a means for retaining the form of the mud guard and detachably connecting the same with the plate member 5. The mounting of the lamp support 26 on the arm 25 of the plate member also substantially simplifies the headlight mounting for motor vehicles in addition to making the same dirigible and results in the production of an assembly which may be manufactured in a most efficient manner and at a relatively small cost in comparison with structures of this character as now made.

Having thus described my invention, what I claim as new is:—

1. A device of the class described, comprising a plate member, a stub axle and spindle formed thereon and projecting from opposite sides, said plate member having laterally extending lugs thereon arranged in a predetermined manner, and a mud guard having lugs thereon arranged in form for interfitting and interlocking cooperation with the lugs on the plate member for mounting said mud guard on said plate member in a predetermined position.

2. A device of the class described, comprising a plate member, a stub axle and spindle formed thereon and projecting from opposite sides, and a mud guard having an opening receiving said plate member and removably attached thereto, said plate member having a forwardly projecting arm formed thereon for receiving and mounting a lamp support.

In testimony whereof I affix my signature.

DOMENICK D'AMATO.